June 1, 1926.
J. W. BEMENT
LUGGAGE RACK
Original Filed May 17, 1924
1,586,939
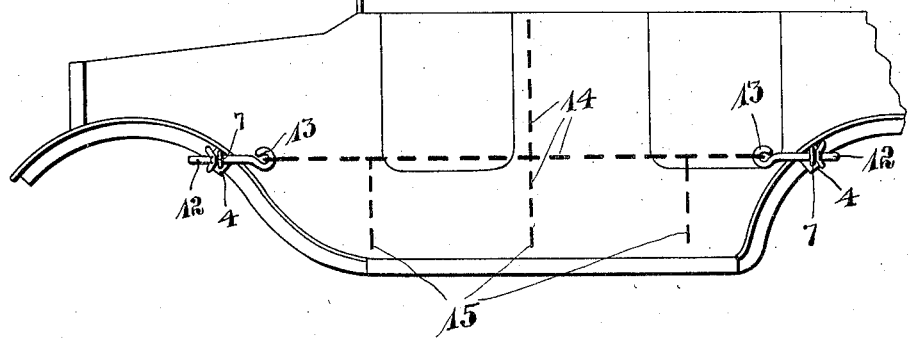
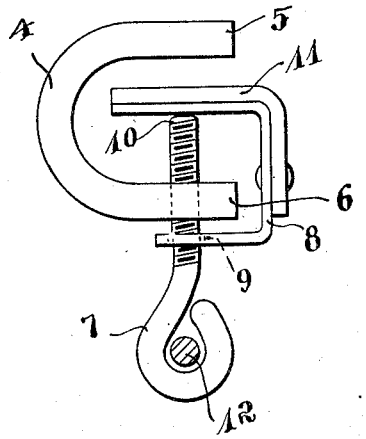
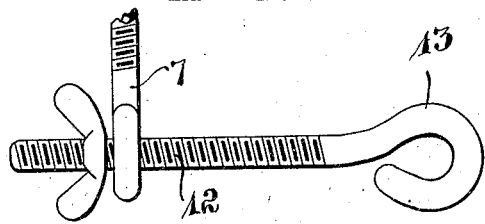
INVENTOR:
JOHN W. BEMENT,
By: *[signature]*,
his Atty.

Patented June 1, 1926.

1,586,939

UNITED STATES PATENT OFFICE.

JOHN W. BEMENT, OF DENVER, COLORADO.

LUGGAGE RACK.

Application filed May 17, 1924, Serial No. 714,074. Renewed March 5, 1926.

This invention relates to devices used for holding packages or articles to the running-board, or to the sides, or in any other similar manner so as to be supported by an automobile.

One of the objects of this invention is to provide a clamping member that can easily be applied over the edges of a fender or of the body of an automobile, so that connected chains may be arranged in conjunction with these clamping members to form a luggage rack.

Another object is to provide a detachable member for a luggage rack made of chains.

Another object is to provide a detachable and adjustable clamping member for luggage chains.

Other objects will appear from the following description and appended claims as well as from the accompanying drawing, in which—

Fig. 1 is a fragmentary outline of an automobile body with fenders and running-board in side elevation, having a luggage chain indicated in dotted lines, and having clamping members illustrated as being applied to the fenders for holding the rack in operative position in accordance with this invention.

Fig. 2 is an edge-wise view of a clamping member in detail of a form embodying this invention.

Fig. 3 is a side elevation of an adjusting bolt to be used in connection with the clamping member in Fig. 2.

A luggage rack made of chains is very practical since easily stored in the tool-box or other place within an automobile, while easily applied and put into proper form for supporting packages and articles, since a chain stretches out or regains its proper operative position easily.

The ends of such a luggage chain or rack must, to make the device easily applicable, be of the simplest form and at the same time offer the best security in holding the chain to an automobile.

A clamping member made in the form as illustrated in Fig. 2, is easily applied over the edges of a fender, or body, or other parts of an automobile. At the same time it is designed to protect the finish of the part to which such a clamping member is applied.

The yoke-like member 4 is designed of a form of a clamping block bifurcated wide enough to reach over any part to which such a chain-end may preferably be applied terminating in the branches or ends 5 and 6. An eye-bolt 7 is adjustably disposed through the end 6 of the member 4 so that it may be moved towards the end 5 of the member 4. A protecting shield 8 is provided with an aperture 9 to make this shield easily shiftable on the eye-bolt 7. This shield is bent and formed to reach over the end 6 of the yoke-like member 4 and to extend over the front end 10 of the eye-bolt 7 so that any article may be clamped by the movement of the eye-bolt 7 between the end 5 of the yoke-like member 4 and the shield 8. To eliminate any marring or scratching of the finish of an automobile, a padding 11 made of rubber or any other similar, suitable material is applied to the shield 8. A connecting bolt 12 is disposed through the eye-bolt 7 as illustrated in Fig. 3. A chain is easily connected to the eye-end 13 of this adjusting or tightening bolt 12.

In Fig. 1 a clamping member 4 is illustrated as applied to each of the fenders, two tightening bolts 12 being illustrated in proper relation to the two clamping members 4. A chain rack is indicated in dotted lines at 14 having two of their ends extending in the direction of the eyes 13 of the bolts 12. Other clamping members may in a similar manner be applied to the ends 15 of the chain 14 so that the chain may be clamped to the running-board or other suitable places or parts of an automobile.

The clamping member is easily adjustable so that it may be tightened over different parts of various thicknesses of an automobile as will easily be understood from the above, and the connecting and tightening bolts 12 may be of such a length that the chains can easily be tightened between the applied clamping members when disposed on an automobile.

Having thus described my invention, I claim:

1. In combination with a luggage chain to be used on a vehicle, a clamping member being bifurcated to form spaced ends, a bolt threaded through one of the ends, and a protecting shield having an aperture to loosely fit over the said bolt and having an extension end to reach over the front end of the said bolt disposed between such bolt-end and the opposite end of the clamping member.

2. In combination with a luggage chain to be used on a vehicle, a clamping member being bifurcated to form spaced ends, a bolt adjustably disposed through one of the ends of the clamping member, and a protecting shield having an apertured end to be loosely disposed over the bolt outside of the clamping member and having an extension-end terminating between the end of the said bolt and the opposite end of the clamping member.

3. In combination with a luggage chain to be used on a vehicle, a clamping member being bifurcated to form spaced ends, an eye-bolt adjustably disposed through one of the ends of the clamping member and projecting with its front end towards the opposite end of the clamping member, a protecting shield having an apertured end shiftably disposed over the bolt between the eye-end of the bolt and the first-named end of the clamping member and having an extension-end terminating between the said front end of the bolt and the opposite end of the clamping member.

4. In combination with a luggage chain to be used on a vehicle, a clamping member being bifurcated to form spaced ends, a bolt adjustably disposed through one of the ends of the clamping member, a protecting shield having an apertured end disposed over the outside of the clamping member and loosely shiftable over the bolt and having an extension-end terminating between the front end of the bolt and the opposite end of the clamping member, and a padding applied to the face of the protecting shield.

In testimony that I claim the foregoing as my invention I have signed my name.

JOHN W. BEMENT.